United States Patent
Dunn (10) Patent No.: US 9,194,340 B2
(45) Date of Patent: Nov. 24, 2015

(54) CYCLE PISTON ENGINE POWER SYSTEM

(71) Applicant: Enhanced Energy Group LLC, West Kingston, RI (US)

(72) Inventor: Paul M. Dunn, W. Kingston, RI (US)

(73) Assignee: Enhanced Energy Group LLC, West Kingston, RI (US)

( * ) Notice: Subject to any disclaimer, the term of this patent is extended or adjusted under 35 U.S.C. 154(b) by 261 days.

(21) Appl. No.: 14/013,187

(22) Filed: Aug. 29, 2013

(65) Prior Publication Data
US 2014/0060013 A1 Mar. 6, 2014

Related U.S. Application Data

(60) Provisional application No. 61/694,858, filed on Aug. 30, 2012.

(51) Int. Cl.
*F02M 25/06* (2006.01)
*F02M 25/07* (2006.01)

(52) U.S. Cl.
CPC ............... *F02M 25/07* (2013.01); *Y02T 10/121* (2013.01); *Y02T 10/16* (2013.01); *Y02T 10/166* (2013.01)

(58) Field of Classification Search
CPC ........... F02C 3/34; F02C 7/08; Y02T 10/121; Y02T 10/16; Y02T 10/166; F05D 2260/61
USPC .................................................. 60/39.52, 278
See application file for complete search history.

(56) References Cited

U.S. PATENT DOCUMENTS

| | | |
|---|---|---|
| 2,884,912 A | 5/1959 | Lewis |
| 3,134,228 A | 5/1964 | Wolansky et al. |
| 3,559,402 A | 2/1971 | Stone et al. |
| 3,736,745 A | 6/1973 | Karig |
| 3,980,064 A | 9/1976 | Ariga et al. |
| 4,434,613 A | 3/1984 | Stahl |
| 4,674,463 A | 6/1987 | Duckworth et al. |

(Continued)

FOREIGN PATENT DOCUMENTS

WO WO-2014036256 A1 3/2014

OTHER PUBLICATIONS

International Search Report dated Nov. 15, 2013.
(Continued)

*Primary Examiner* — Thai Ba Trieu
*Assistant Examiner* — Vikansha Dwivedi
(74) *Attorney, Agent, or Firm* — Locke Lord LLP; David J. Silvia; Daniel J. Fiorello (57) ABSTRACT

Disclosed is a cycle piston engine power system in which a compression ignition or spark ignition reciprocating piston engine is made non-emissive via a semi-closed cycle, in a manner which produces saleable $CO_2$ product at pressure. The cycle piston engine power system can includes, among other elements, a piston engine for generating power and exhaust gas; a water cooling and separation unit which receives the exhaust gas and cools and removes water from the exhaust gas to create $CO_2$ gas supply; a mixing pressure vessel which receives at least a portion of the $CO_2$ gas supply from the water cooling and separation unit and mixes the $CO_2$ gas supply with oxygen to create a working fluid to be provided to the piston engine; and an oxygen generator for providing oxygen to the mixing pressure vessel.

22 Claims, 5 Drawing Sheets

(56) References Cited

U.S. PATENT DOCUMENTS

| | | | |
|---|---|---|---|
| 4,899,544 A | 2/1990 | Boyd | |
| 6,622,470 B2 | 9/2003 | Viteri et al. | |
| 6,637,183 B2 | 10/2003 | Viteri et al. | |
| 7,043,920 B2 | 5/2006 | Viteri et al. | |
| 7,472,550 B2 | 1/2009 | Lear, Jr. et al. | |
| 7,827,794 B1 | 11/2010 | Pronske et al. | |
| 7,882,692 B2 | 2/2011 | Pronske et al. | |
| 7,926,275 B1 | 4/2011 | Dunn | |
| 7,926,276 B1 | 4/2011 | Dunn | |
| 7,937,930 B1 | 5/2011 | Dunn | |
| 7,951,339 B1 | 5/2011 | Dunn | |
| 8,156,726 B1 | 4/2012 | Dunn | |
| 8,205,455 B2 | 6/2012 | Popovic | |
| 8,596,075 B2 | 12/2013 | Allam et al. | |
| 8,776,532 B2 | 7/2014 | Allam et al. | |
| 8,869,889 B2 | 10/2014 | Palmer et al. | |
| 2001/0042367 A1 | 11/2001 | Frutschi et al. | |
| 2004/0003592 A1 | 1/2004 | Viteri et al. | |
| 2007/0199300 A1* | 8/2007 | MacAdam et al. | 60/39.52 |
| 2011/0138766 A1* | 6/2011 | Elkady et al. | 60/39.24 |
| 2011/0192139 A1 | 8/2011 | Paik | |
| 2012/0023956 A1 | 2/2012 | Popovic | |
| 2014/0230401 A1* | 8/2014 | Dunn | 60/39.52 |

OTHER PUBLICATIONS

International Search Report and Written Opinion dated Dec. 10, 2013 from related PCT Application No. PCT/US2013/057290.

* cited by examiner

CYCLE PISTON ENGINE POWER SYSTEM

CROSS REFERENCE TO RELATED APPLICATIONS

This application claims priority to U.S. Provisional Patent Application Ser. No. 61/694,858, filed Aug. 30, 2012, entitled Cycle Piston Engine Power System, the disclosure of which is herein incorporated by reference in its entirety.

BACKGROUND OF THE INVENTION

1. Field of the Invention

The invention generally relates to a cycle piston engine power system and more particularly to a semi-closed cycle piston engine power system having an integrated oxygen generation, SC $CO_2$ heat recovery and carbon dioxide capture and clean-up sub-systems.

2. Background of the Related Art

Conventional power systems, whether internal or external combustion, burn fuel with air and generally vent the combustion products (exhaust/flue gas) to the air (or via underwater interface to the air). This is true of natural gas, gasoline, and diesel piston engines, and also of gas turbines, jet engines, or even steam boiler based power plants. Emissions of the untreated flue gas to the air, while simple to execute, is not desirable for environmental reasons. Gases such as $SO_2$, NOx, CO, HC (unburned hydro carbon) and more recently $CO_2$ are defined as pollutants and are regulated. In special purpose applications, in particular for undersea applications, the requirement to tie the system exhaust pressure to the ambient pressure (elevated backpressure) can lower engine cycle efficiency significantly. In other special purpose applications, in particular at higher altitudes, the requirement to tie the system pressure to the ambient pressure (reduced inlet pressure) can reduce specific power significantly, and may also impact efficiency.

As a result, there has been a desire to become non-emissive and/or to have less of an adverse impact from the local ambient pressure, and prior work on various closed or semi-closed power systems has occurred. Historically (in the first part of the 1900's) this work was mostly related to the special purpose applications. More recently it is mostly about the ability to provide higher efficiency and/or effectively control emissions or even capture system emissions, in particular $CO_2$.

The strongest early motivation to develop closed and semi-closed power systems has been tied to the production of power undersea. In U.S. Pat. No. 2,884,912, a simple method of operating a piston engine using liquid oxygen, while using the liquid heat of vaporization to condense the products is disclosed. Since this is an undersea application, there is no discussion of product clean up or the production of oxygen. In U.S. Pat. No. 3,134,228 another clearly undersea semi-closed power system is disclosed, using turbines. Again, liquid oxygen (LOX) is carried on board as the oxidizer. Condensed water is pumped and used as the combustion diluent to control temperatures, in the same way water, oxygen, and hydrocarbon are combined in "steamfish" torpedoes, such as the US Mk 16 (introduced late in WWII). In U.S. Pat. No. 3,559,402, liquefaction of the $CO_2$ and storage is disclosed. Again the vaporization of the onboard liquid oxygen is used to provide the refrigeration. Importantly, no effort is made to operate the engine at other than normal atmospheric conditions. In fact, 14 psia is the recirculating pressure for the $CO_2/O_2$ stream.

In U.S. Pat. No. 3,736,745, a "supercritical" closed cycle turbine system is introduced. There are some technical problems with this patent, but it is intended to operate at depth and at high enough backpressure that both the $CO_2$ and water product are condensed together as liquids, without the use of cryogenic oxygen.

In U.S. Pat. No. 3,980,064, Nissan motors provides details on a piston engine or rotary piston engine patent using $H_2O_2$ as the oxidizer. This system includes exhaust recirculation, but the patent is mostly about the injector design and the ability to burn multiple fuels. Injector design for direct use of $H_2O_2$ is critical as decomposition can occur at points in the cycle where it would not be desirable.

In U.S. Pat No. 4,434,613, the General Electric Company introduces the semi-closed cycle gas turbine (Brayton Cycle) for "chemical" production, including $CO_2$. This patent is clearly not for undersea application, and the integration of the system with a cryogenic air separation unit is included. The system is not operated at high backpressure, and the recirculated exhaust gases ($O_2$, $CO_2$ and others, not mentioned herein). The point of this gas mixture is to mimic the thermodynamic properties of air, so that existing, 14 psia inlet pressure molecular weight 29 (air) gas turbine machinery designs could be used. As is also typical of GE, a Heat Recovery Steam Generator (HRSG) is used, not a recuperator. However, U.S. Pat. No. 3,134,228, does not disclose any details or methodologies associated with product gas clean up. In U.S. Pat. No. 4,674,463, the Cosworth Engine company reintroduces the semi-closed cycle piston engine for undersea applications. The ability to vary the oxygen concentration to values lower than 21% was used to limit oxygen loss in the direct sea water condensation process.

In the Dunn Brayton Patents, U.S. Pat. Nos. 7,926,275, 7,926,276, 7,937,930, 7,951,339, and 8,156,726, the closed (metal fuel) and semi-closed (hydro carbon fuel) Brayton (gas turbine) cycles are introduced. These patents are specifically not at atmospheric pressure, but at high closed cycle pressures (subcritical or supercritical). Inert gas working fluids, mixtures of inert gas working fluids and $CO_2$, and $CO_2$ only are discussed. Two of these patents address a gas clean up methodology, but it is not associated with gas product, but with scrubbing any metal vapor (fuel) out of the gas to avoid plating inside the turbine or recuperator. Oxygen generation is not addressed, since these patents were targeted towards undersea systems with high pressure bottled or liquid oxygen.

In U.S. Pat. No. 8,205,455, GE provides a complex arrangement of gas turbines, with stoichiometric (air based) combustion and exhaust gas recirculation. In this system, $N_2$ and $CO_2$ are recirculated, and only enough high pressure air is used to support the combustion—the reduction in excess air makes the flue gas easier to clean up for other applications.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages and in accordance with the purpose of the invention, as embodied, the invention includes, in one aspect an improved piston engine semi-closed cycle power system. A further aspect of this invention is that the system be compact, capable of operation at higher than ambient exhaust pressures, and that engine operation, heat recovery, oxygen generation, and gas clean up be integrated in a fashion that improves efficiency and lowers capital cost. The intended result is to produce non-emissive power, at the same or better net cycle efficiency (specific fuel consumption) of the engine alone, and to also provide saleable (pipeline specification) CO2 at pressure.

The ability to independently control the amount of excess oxygen, and the oxygen to diluent ratio in the engine intake manifold is also desired and is part of the design; specifically, the ability to operate at much higher than 21% oxygen allows the use of very low heating value fuels, or fuel water slurries, while still achieving good combustion in the engine.

The present invention is directed to a cycle piston engine power system that includes, inter alia, a piston engine, a water separation and cooling unit, a mixing pressure vessel and an oxygen generator. The piston engine generates power and exhaust gas. The water cooling and separation unit receives the exhaust gas from the piston engine and cools and removes water from the exhaust gas to create $CO_2$ gas supply. At least a portion of the $CO_2$ gas supply is provided to the mixing pressure vessel which mixes the $CO_2$ gas supply with oxygen to create a working fluid to be provided to the piston engine. The oxygen generator provides the oxygen to the mixing pressure vessel.

In certain embodiments, the system further includes a blower which receives the working fluid from the mixing pressure vessel and provides the working fluid to the piston engine. A turbo charger can be provided which receives the working fluid from the blower and provides it to the piston engine.

Preferably, the cycle piston engine power system further includes a heat recovery unit to generate additional power. In certain constructions, the heat recover unit generates the additional power via the super critical Brayton $CO_2$ cycle.

It is envisioned that in certain constructions, the oxygen generator includes a first and a second Pressure Swing Adsorption bed. The oxygen generator can generate the oxygen via mechanical integration of the PSA beds with the piston engine.

In certain constructions of the present invention, the oxygen generator is an integrated molecular sieve based air separation unit. Alternatively, the oxygen generator is a membrane based air separation unit or a cryogenic based air separation unit.

It is further envisioned that the system can include a gas clean-up subsystem which receives a portion of the $CO_2$ gas supply from the water cooling and separation unit and provides conditioned $CO_2$ gas at a desired pressure. In embodiments of the present invention, the gas clean-up subsystem is a temperature swing adsorption system which includes at least two temperature swing adsorption (TSA) beds.

It is still further envisioned that the system can include a waste heat recovery system and/or an adsorption chiller refrigeration system.

Preferably, the system is a semi-closed system.

The present invention is further directed to a cycle piston engine power system that includes, among other elements, a piston engine, a water cooling and separation unit, a mixing pressure vessel, an oxygen generator and a gas clean-up subsystem.

The piston engine generates power and exhaust gas which is provided to the water cooling and separation unit which receives the exhaust gas and cools and removes water from the exhaust gas to create $CO_2$ gas supply. The mixing pressure vessel receives at least a portion of the $CO_2$ gas supply from the water cooling and separation unit and mixes the $CO_2$ gas supply with oxygen to create a working fluid to be provided to the piston engine. The oxygen generator provides oxygen to the mixing pressure vessel to be used in creating the working fluid. The gas clean-up subsystem receives a portion of the $CO_2$ gas supply from the water cooling and separation unit and provides conditioned $CO_2$ gas at a desired pressure which can be used in other processes or applications.

It is envisioned that this system can include a blower which receives the working fluid from the mixing pressure vessel and provides the working fluid to the piston engine.

The system can also include a turbo charger which receives the working fluid from the blower and provides it to the piston engine. A heat recovery unit can also be provided to the system to generate additional power.

In certain embodiments of the invention, the gas clean-up subsystem is a temperature swing adsorption system which includes at least two temperature swing adsorption (TSA) beds or a combination of TSA and Pressure Swing Adsorption or VPSA beds, if two stage contaminant removal is required.

The present invention is still further directed to a semi-closed cycle piston engine power system, among other elements, a piston engine, a water cooling and separation unit, a mixing pressure vessel, and a blower. The piston engine generates power and exhaust gas. The water cooling and separation unit receives the exhaust gas and cools and removes water from the exhaust gas to create $CO_2$ gas supply. The mixing pressure vessel receives at least a portion of the $CO_2$ gas supply from the water cooling and separation unit and mixes the $CO_2$ gas supply with oxygen to create a working fluid to be provided to the piston engine and the oxygen generator for provides oxygen to the mixing pressure vessel. The blower receives the working fluid from the mixing pressure vessel and provides the working fluid to the piston engine.

BRIEF DESCRIPTION OF THE DRAWINGS

So that those having ordinary skill in the art to which the present invention pertains will more readily understand how to employ the systems and methods of the present invention, embodiments thereof will be described in detail hereinbelow with reference to the drawings, wherein.

These and other aspects of the subject invention will become more readily apparent to those having ordinary skill in the art from the following detailed description of the invention taken in conjunction with the drawings.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The present invention generally relates to a system of operating a compression ignition or spark ignition reciprocating piston engine in a semi-closed cycle, in a manner which is non-emissive, and which produces saleable products, in particular $CO_2$ at pressure. The power system is fed with an integrated molecular sieve based air separation unit which provides oxygen. (Alternatively, it could be fed with a membrane based air separation unit, or a cryogenic based air separation unit. The molecular sieve approach is preferred, since the membrane system would have lower oxygen purity and increased nitrogen levels—good for engine operation, but bad for gas clean up system, and the cryogenic based system would produce very high oxygen purity, but in general would have little or no Argon present—good for gas clean up, but bad for engine operation).

Exhaust gas (e.g., mostly $CO_2$) is recirculated to provide a combustion diluent and working fluid. System high grade waste heat is used to cool the exhaust (part of the process) and to generate additional power via a sub/super critical $CO_2$ Brayton cycle. Generated product, $CO_2$ is compressed, purified, and provided at pressure for the user, and also as a working fluid in the heat recovery system. The heat recovery system also in turn provides dry hot $CO_2$ for use in regenerating the gas purification thermal swing adsorption molecular sieves. Finally, low grade waste heat is used via the adsorption chiller process to provide refrigeration for $CO_2$ liquefaction.

It is to be appreciated this system of the present invention is of particular use wherein both power and $CO_2$ at pressure are required for a process. Enhanced Oil Recovery is an example of such a process. It is further to be appreciated that the system of the present invention is applicable to two stroke, opposed piston engines, and to conventional two stroke, four stroke, and rotary piston engines. Medium speed engines (which have greater time for the combustion process), and especially engines tolerant of operation at high "boost" (intake manifold) pressure (such as medium speed opposed piston engines or heavy duty low to medium speed four stroke engines) are suited to the cycle but the invention is not to be understood to be limited to such medium speed engines.

It is noted that while the below described system has many components for the embodiment with the highest efficiency, portions of the system are optional, for example waste heat recovery system or adsorption chiller refrigeration system. Several alternative embodiments with various combinations of the aforementioned building blocks are also claimed.

Figure 1:
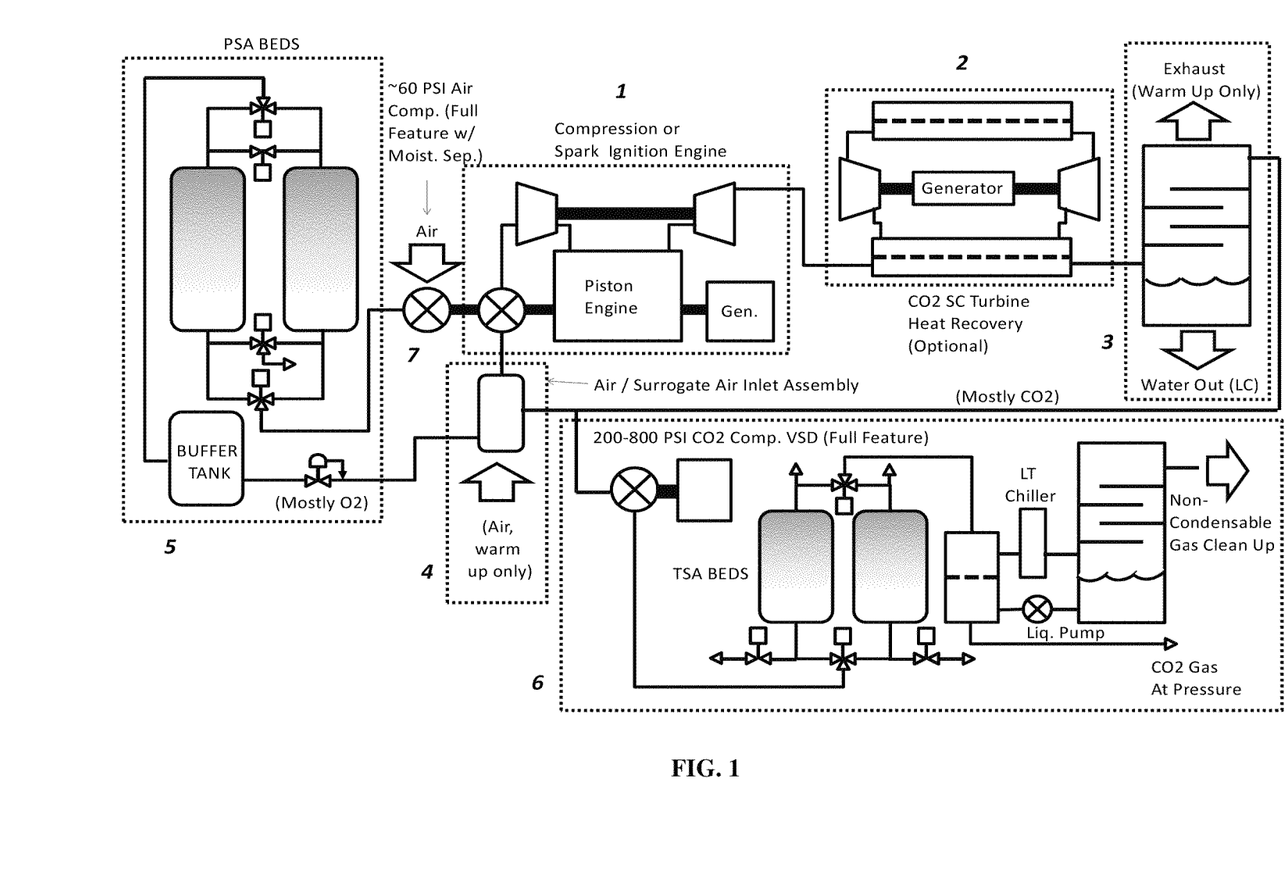
FIG. 1 schematically illustrates an embodiment of the cycle piston engine power system of the present invention.

Turning now descriptively to the drawings, in which similar reference characters denote similar elements throughout the several views, FIG. 1 depicts an embodiment of the present cycle piston engine power system which has been designated by reference numeral 100. System 100 includes an unmodified blower scavenged turbo charged two stroke piston engine 1. The FME 8⅛ 38D Opposed Piston engine is an example of such a machine. In most larger two stroke piston engines, scavenging is provided via blower, and in the medium speed, continuous design of the FME OP, the amount of blower airflow is 2-3 times what is required to support the oxygen required for combustion, the additional air serves as the diluent and working fluid of the machine. A turbo charged only version of such engines is offered, but nearly all (large) naturally aspirated two stroke engines include blowers. The turbo blower version is depicted, and engines of this type operate at relatively high boost pressure, and for two stroke engines, relatively high Net Mean Effective Pressure. Specifically the 12 cylinder Turbo Blower OP produces 4200 hp from 12,422 cubic inches (8.125" bore, 20" total stroke), this results in an NMEP of 149 psi, and when correcting for the blower power, the actual engine NMEP is 156 psi. The point of this discussion is that achieving numbers approaching ½ hp per cubic each at 900 rpm requires high boost pressure—the turbo charger (and blower) combine to provide over 25 psig (40 psia) intake manifold pressure in this engine—exhaust pressure, upstream of the turbo charger, is similar. This is a high boost pressure for a continuous duty engine.

In system 100, engine 1 is connected in a semi-closed cycle configuration, with a heat recovery unit Sub-system 2 used to cool exhaust and recover additional power. Sub-system 3 provides additional cooling and separates a portion of the water from the exhaust via condensation and mechanical phase separation—this facilitates recirculation of what could be 50-90+% $CO_2$ back to a mixing pressure vessel Sub-system 4. Sub-system 4 receives the warm exhaust recirculation flow and combines it with moderate to high purity oxygen from Sub-system 5, the air separation unit. The Sub-system 5 Pressure Swing Adsorption based air separation unit is directly or indirectly driven by the engine—ideally with the load from the air separation process more than offset by the additional power from the heat recovery process. The details of PSA operation will be discussed in the illustrative embodiment, but an important point is that oxygen can be provided from Sub-system 5 to Sub-system 4 at significant positive pressure. It is noted the system 100 operates at recirculation pressures similar to or slightly above what would normally be boost pressure for the engine—potentially eliminating the costly turbo-charger component, eliminating or significantly reducing the size and cost of the aftercooler component, and greatly reducing the size and complexity of the gas separation components.

Sub-system 6 is a simplified depiction of the gas cleanup system. A variable speed drive operates a fixed displacement compressor which removes a portion of the exhaust recirculation gas (mostly $CO_2$), dries it via a Thermal Swing Adsorption Process, and then liquefies and pumps the $CO_2$, ultimately providing dry pipeline quality $CO_2$ to the customer.

Sub-system 7 is a full feature compressor, with moisture separation, that provides relatively dry and cool air for the Sub-system 5 PSA. In the preferred embodiment, Sub-system 7 is directly driven by the engine, in a manner similar to the blower/supercharger. The volume of air required for the PSA process is not significantly different from the amount of total air typically pumped through the Opposed Piston (OP) engine.

Figure 2:
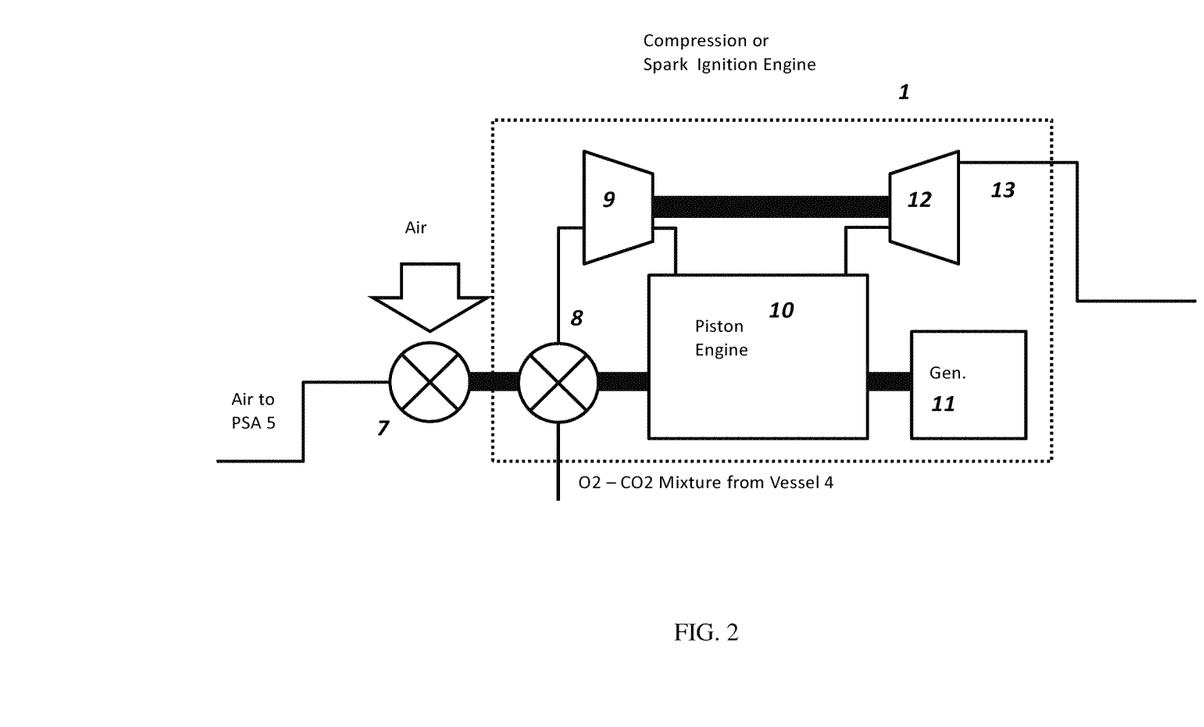
FIG. 2 illustrates a piston engine sub-system and main air compressor used with the system of FIG. 1.
Figure 3:
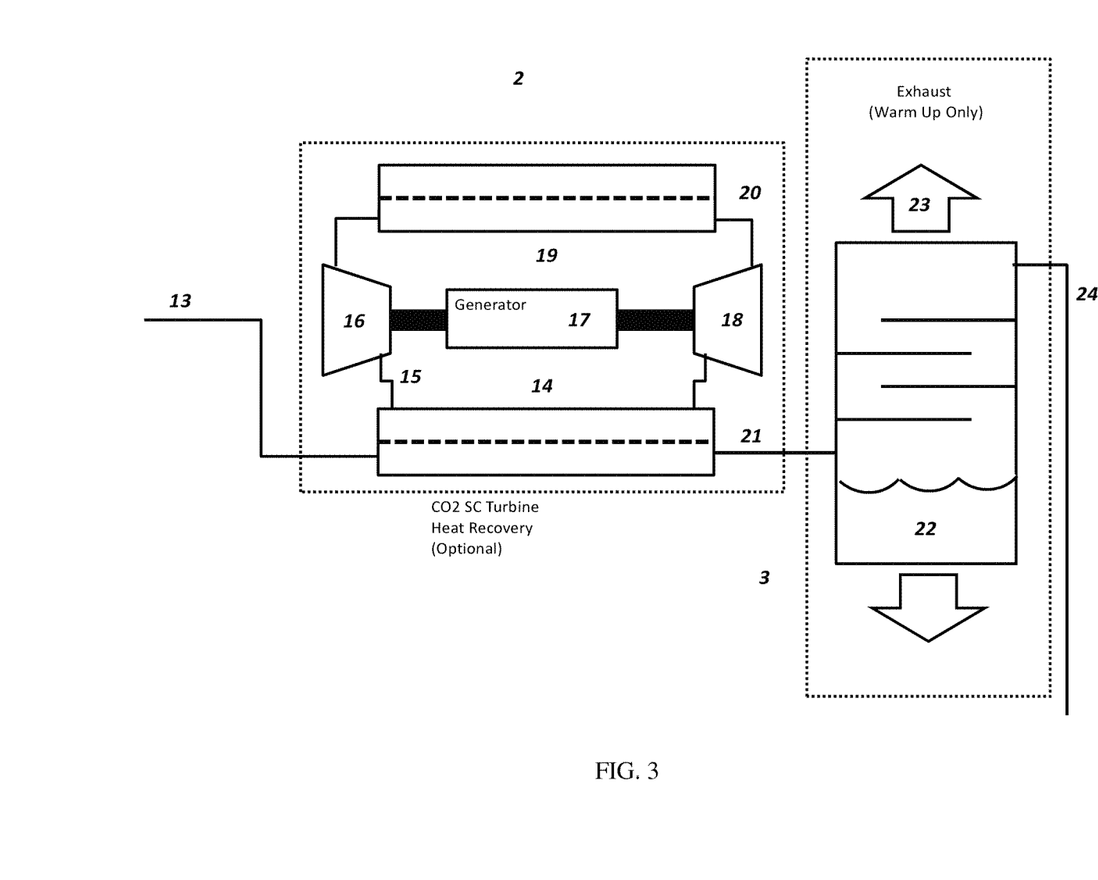
FIG. 3 illustrates a heat recovery unit and water separator which can be used with the system of FIG. 1.
Figure 4:
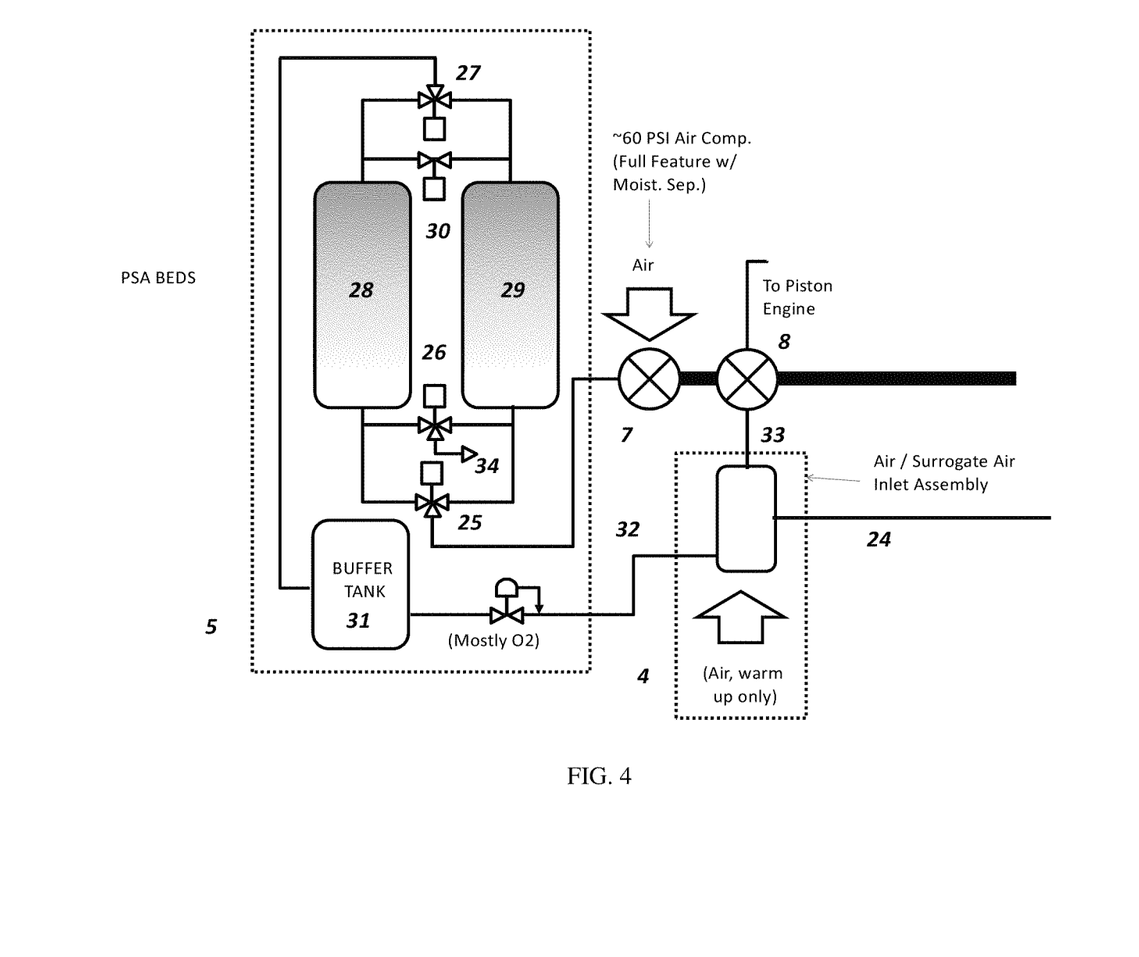
FIG. 4 illustrates a mixing pressure vessel intake assembly and an oxygen generator which can be used with the system of FIG. 1.
Figure 5:
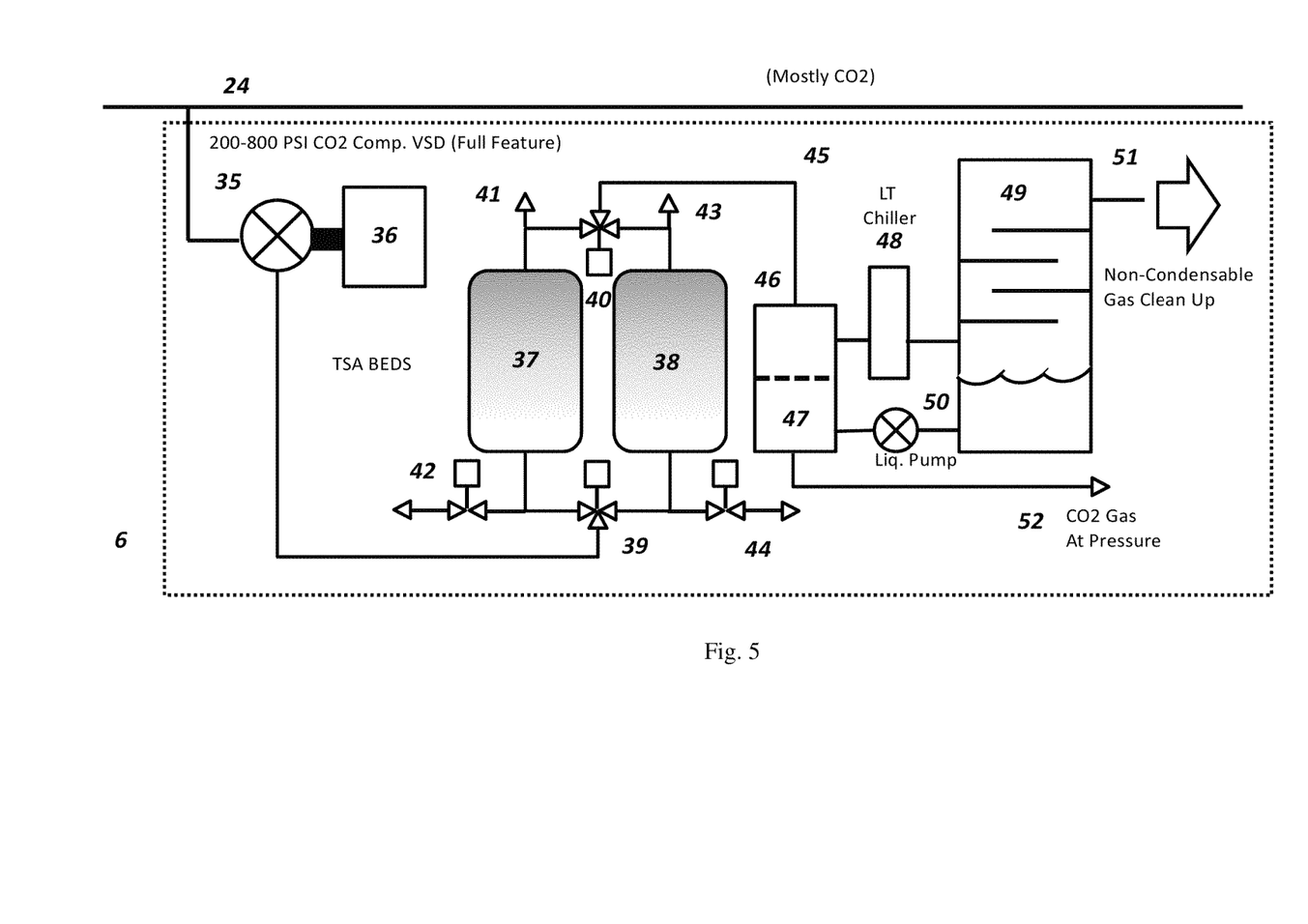
FIG. 5 illustrates a gas clean up system that can be used with the system of FIG. 1.

Referring now to FIG. 1 for the overall arrangement of system 100; to FIG. 2 for the details associated with Sub-System 1, the Piston Engine, and main air compressor, Sub-System 7; to FIG. 3 for the details associated with Sub-System 2, the Heat Recovery SC Brayton Generator, and with Sub-System 3, the main water separator; to FIG. 4 for the details associated with the Sub-System 4 intake assembly and Sub-System 5 Oxygen Generator; and to FIG. 5 for the details on Sub-System 6, the gas clean up system.

A blower, 8, is directly coupled to the engine shaft to provide scavenging (in 2—Stroke engines). Normally, a blower/supercharger could have significant pressure difference, to help create boost in the engine. In the system 100, since the engine is already at elevated pressure, with both intake and exhaust sides running between 15 and 60 psia (40 psia nominal) this blower is lightly loaded and provides sufficient pressure difference for scavenging (1-2 psi), recirculation system pressure drop, and to aid starting. In an alternative embodiment, in an engine which is self-scavenging (for example a four stroke engine), the blower would not be required.

The blower, 8, provides working fluid (mixture of $O_2$, $CO_2$, and other gases) via the optional turbo charger compressor, 9, to the engine, 10, which is directly coupled to the generator, 11, or other load. As is typical, the turbo charger turbine, 12, is directly coupled to the turbo charger compressor, 9. As discussed, this engine is capable of operating at significant boost pressure without a turbo charger, and components 9 and 12 may be deleted—the invention would work equally well starting with a "naturally aspirated" two stroke engine. Regardless of whether the turbo charger is present or not, the exhaust temperature at point 13 is higher in this design than with a conventional turbo charged engine—since the turbo charger is either deleted or operating with very little pressure difference, there is also very little temperature difference across the turbine. Similarly, the compressor discharge temperature (engine, 10, intake manifold temperature) is lower. Specifically, for a 40 psia engine operating (boost) pressure, with nominally 15 psia air, using 85% efficient compressor and turbine stages, the air from the compressor would increase in temperature by over 200 deg F., typically from 100 F to 300+F (without aftercooling). For the same engine, the exhaust temperature would be over 300 F higher upstream of the turbo charger compressor than downstream—in a typical medium speed engine with this boost level, exhaust manifold temperature would be 1100 F at maximum load, with turbocharger exit temperature around 800 F. Since system 100 can lower the engine intake manifold temperature, without the use of aftercooling, is of value and increases power density. The fact that this engine can operate at significant boost pressure, but deliver a higher temperature at the exhaust, point 13, is of greater value.

Sub-system 2, the super/sub-critical $CO_2$ Brayton cycle heat recovery generator, receives the high temperature engine exhaust from point 13, and cools it via the hot-side heat exchanger, 14. This results in conditions at point 15, the Sub-system 2 turbine inlet, of 1050 F (about 50 deg F lower than exhaust temperature), and supercritical pressure, nominally 6000 psia. Sub-system 2 uses pure $CO_2$ as the working fluid. The fluid is expanded through turbine 16 to 1200 psia (at design point), driving generator 17 and compressor 18. Low side heat exchanger 19 cools the supercritical $CO_2$ to approximately 100 F at point 20. The working fluid ($CO_2$) is recompressed in compressor 18, and is provided at approximately 6000 psia, 275 F to the heat exchanger 15. The net result is that piston engine 10 exhaust has been cooled from 1100 F at point 13 to 300 F at point 21. Note, all these pressures and temperatures are estimates at design point, and would vary with load. Also note, a closed supercritical $CO_2$ Brayton cycle heat recovery system is controlled via management of the load at generator 17 (runs at constant speed, hence constant pressure ratio), and by varying the total mass in the cycle. While 1200 psia inlet, 6000 psia outlet might be the compressor design point at full power, at $1/10^{th}$ power one would expect nominally 120 psia, and 600 psia at the same points—and cycle efficiency would in theory be unchanged (in fact it degrades slightly, since the cycle is closer to optimum at supercritical pressures). Other choices in pressure ratio and heat exchanger design pressure are of course possible. The pressure ratio of 5 is not optimum for the Brayton cycle alone, but gives reasonably low compressor exit temperatures, enabling good use of the available engine exhaust waste heat.

The fact that the piston engine 10 is operating at high total pressure and high exhaust pressure is important and is a significant part of the inventive aspects of system 100 that makes this cycle more practical (reduces HX sizes). A super critical $CO_2$ Brayton cycle operating with a pressure ratio of approximate 5, with 85% efficient machinery, operates at almost 21% cycle efficiency with high side temperature of 1050 F (1100 F exhaust temperature at point 13 and 50 deg. F. heat exchanger approach temperature). A super critical $CO_2$ Brayton cycle with a recuperator would operate at even higher efficiency, to 30% or more, but would not cool the exhaust as much. It would cool the exhaust sufficiently that a more conventional waste heat to power system (typically R134A based) could be used as a bottoming cycle, without the use of thermal oils or other techniques to prevent thermal breakdown of the refrigerant working fluid. Under the expected conditions (no turbo charger, high exhaust temperature, no recuperator), Sub-System 2 would add 10% or more to the total system output, i.e. generate an additional 300 kW from the 3 MW generator at full load. A conventional turbo charged engine, with 800 F exhaust, would result in a lower cycle efficiency, by 2 points or more, but more significantly in a lower amount of available heat, reducing Sub-System 2 delivered power by 40% or more.

The partially cooled engine exhaust, still with superheated water vapor, flows from point 21 (at 300 F nominally) to Sub-System 3 (or via a conventional bottoming cycle waste heat to power system to Sub-System 3), the water separator. Additional cooling is provided, which results in the majority of water from the combustion process condensing. Liquid water collects in the bottom of the water separator 3, with the amount of water withdrawal controlled via liquid level control at point 22, and via thermal management (cooling) of the water separator Sub-System 3. The amount of cooling at this point determines the saturation level (partial pressure) of the water vapor in the recirculated exhaust stream at 24. At 140 deg F., the partial pressure of water vapor will be about 3 psia at point 24. If the system pressure is 40 psia, then the recirculated exhaust will be 7.5% ($3/40^{th}$) water vapor by volume. Water vapor concentration can be increased to double that by cooling to only 170 F, or half of that by cooling to 110 F. Ideally the recirculation line 24, and Sub-System 4 mixing vessel are held above these temperatures (typically jacketed lines/vessels, using jacket water from the engine 10, which will be above 170 F) to avoid condensation of the water. Condensation of the water at these points could otherwise result in corrosion (formation of carbonic acid with CO2). Sub-system 3 also has an exhaust valve for system startup. Sub-System 4 is no more than a small water jacketed pressure vessel, with internal screens to provide for good mixing of exhaust recirculation gas 24 with Sub-System 5 oxygen to provide a "surrogate" air mixture for the engine 10. Sub-system 4 also includes a valve/check valve to admit air for system start up.

Sub-system 5, the oxygen generator or air separation unit, operates via the Pressure Swing Adsorption (PSA) process (a subset of which is the Vacuum Pressure Swing Adsorption (VPSA) process). Sub-system 7 is a full feature compressor, which means it includes refrigerated drying, with the resulting air having a dew point of 45 deg F or less. Air is provided at pressure to a set of solenoid or air operated three-way valves, 25, 26, and 27, which operate simultaneously to port air supply to alternate between vessel/bed 28 or vessel/bed 29. The vessels are filled with molecular sieves, flow distribution plates, filter media, and screens, and are spring loaded to maintain a constant bed pressure. The valves operate simultaneously to switch air flow from bed 28 to bed 29 and vice versa. Cycle time will depend on unit size, but is typically measured in minutes. Valve 30 provides a means to equalize bed pressure during the transition, and also the ability to purge the bed not in use with oxygen product. Produced oxygen flows via buffer tank and control valve regulator 31 to Sub-System 4.

Oxygen can be produced at purities of up to 95% at point 32, when operating at 95% the balance of gases is mostly Argon (4.5%), with much smaller amounts of Nitrogen (0.5%). Typically, slightly lower purity is preferred (increased O2 production), with the lower purity resulting in larger amounts of N2. The mixture of the produced oxygen at point 32, with the recirculated flow from 24, yields the surrogate "air" for engine operation at point 33. The ability to vary system pressure (to be discussed), intake temperature (with net intake manifold temperatures lower than achievable with the non-after cooled piston engine), gas mixture (percent O2), and the ratio of available O2 to combustion requirements provides for higher system efficiencies, and control of system emissions.

Oxygen can be generated via the Pressure Swing Adsorption process, or via connection of a vacuum source at point 34, via a Vacuum Pressure Swing Adsorption process. The latter is generally thought of as more efficient, but would not allow for operation at the higher system pressures possible with a PSA. As those familiar with the design of these systems, the specific molecular sieve used would vary with the process selected. Alternatively, the membrane air separation approach could be used, and would certainly provide an oxygen rich mixture at pressure, or in larger systems, where it becomes more cost effective a cryogenic oxygen generation approach could be used.

Oxygen recovery of better than 50% of air flow can be achieved with a strong vacuum (less than ½ atmosphere) and with the use of a LiX adsorbent, such as UOP VSA-10. System pressure at point 32 would still be positive (above atmospheric pressure), but would not reach the full boost pressure level of the engine 10, without the use of an additional compressor. The PSA approach, though perhaps lower efficiency (~40% recovery) when considered independently as an O2 source, is preferred for the system, since significantly higher operating pressures are provided, which reduces component size (and capital cost) in all the other Sub-Systems. Pressure at point 32 of over 40 psia is easily achieved (with 60 psig air supply, and up to 100 psig air supply can be used), with similar purity capability to VPSA systems using either UOP PSA O2 HP or O2 XP MOLSIV™.

For natural gas fuel, concentration at point 24 of $CO_2$ will vary to a high of about 91.5% (by mass of dry gas, balance mostly Argon) when oxygen introduction is 100% of combustion requirements and O2 purity at point 32 is 95%. When oxygen purity is lower, or when oxygen is intentionally delivered at greater than combustion requirements (for example to achieve good combustion), the mixture at point 24 will change. An oxygen purity of 90% (by volume) at point 32, and 110% of combustion requirements, will yield 11% O2, 7% Ar, 7%, N2, and 75% CO2 (all by mass). Obviously the ability to operate at even higher excess O2 levels, or with lower purity exists, though is not preferred since it increases the complexity of the clean-up system, Sub-System 6.

Sub-system 6 withdraws excess recirculation gases from line 24 via positive displacement compressor 35 and variable speed motor 36. The speed of motor 36 is varied to maintain the desired pressure in the recirculation line, and indirectly in Sub-System 4. As discussed, the gas withdrawn is mostly CO2, but also includes some portion of O2, Ar, N2, and even some products of incomplete combustion, such as HC or CO. In addition, the gas is saturated in water vapor, at probably 7% or so by volume. The full feature compressor 35, removes most of the water vapor by the combination of compression, cooling and coalescing filter moisture separation, but dew points can be expected to remain at 45-50 deg F. of so, which is a partial pressure of 0.1-0.2 psia of water.

Thermal Swing Adsorber (TSA) beds 37 or 38 are used, controlled via three way valves 39 and 40, to complete the drying process, and adsorb a portion of other undesirable gases. The TSA is functionally similar to PSA (and the use of a PSA or VPSA, is an alternative, as are a combination of TSA/PSA and VPSA), a molecular sieve approach which adsorbs certain molecule sizes (with a 3A adsorbent or alumina, focused mostly on water removal, and with small amounts of other adsorbents to be tuned based on expected contaminants), but the regeneration is thermal—with hot dry gas used via ports/valves 41-44 to renew the beds (methodology to follow later). The amount of material (water) being removed is already quite low, and cycle times for these beds will be hours, not minutes. Drying to dew points of −80 F or lower is possible with this technology, though is not required for this application. The goal is only to remove water vapor, and a portion of the other non-CO2 contaminants, to the level where frosting will not occur in later semi-cryogenic portions of the process. It is expected that dew points of −40 deg F. or better will be achieved at point 45, but that some "non-condensable" gases will remain. Small amounts of N2 or Ar may be present, and depending on the operating conditions of the system, significant amounts of O2 may exist. The latter is a problem for pipeline specification $CO_2$ (desired $O_2$ level 10 ppm). Elimination of the $O_2$ is by physical separation of the liquid $CO_2$ from gaseous (non-condensable) contaminants, or alternatively, via another PSA process, using a different molecular sieve, most likely 13X. Another alternative to elimination of the oxygen is of course to operate the semi-closed cycle engine in a fuel rich mode, or to scavenge any oxygen in the exhaust in a catalyst or combustion can prior to the Sub-system 2 waste heat to power/heat recovery system.

In the semi-cryogenic phase separation process for oxygen and other non-condensable gas removal, a counterflow heat exchanger 46, using the heat of vaporization of the previously liquefied $CO_2$, 47, provides initial cooling of the $CO_2$ rich mixture, which then flows to a low temperature chiller 48. $CO_2$ liquid is separated physically from other gases via separator 49, pumped as a liquid to 2000+ psig via pump 50, and vaporized back to the gaseous state in the heat exchanger. Gases are vented at point 51, or returned to other parts of the process, which could for example include the air feed into Sub-System 5, though total Argon level (which will tend to concentrate) in the process must be managed. Product gaseous, dry, and relatively pure CO2 is provided at point 52.

At the more detailed level, an additional integration of this TSA drying system (Sub-System 6), and the SC CO2 Brayton Cycle (Subsystem 2) (not shown) but is discussed herein. Periodically, as discussed, the beds will require regeneration. Normally, product (dry $CO_2$) is electrically heated to 600 F or more, and is blown counterflow back through the beds for drying. This wastes product and power, and also requires additional components. In this invention, turbine inlet bleed $CO_2$ from 15 is ported to points 41 or 43, and vented with valves 42 or 44, to regenerate the bed. Also periodically, additional working fluid mass may be required in Sub-System 2. Dry $CO_2$ is provided at pressure from point 52, to compressor inlet, point 20 to increase mass in Sub-System 2. Finally, periodically, the mass in Sub-System 2 must be reduced, the same line as for regeneration is used, but without opening valves 42 or 44.

Other accessories, familiar to those with engine emissions control experience, can be integrated to this system to meet local emissions requirements. Obviously, the emission of $CO_2$ is all but eliminated with this system, but HC or CO may exist at point 13, or alternatively high levels of $O_2$ may exist at point 13—a catalytic or piloted reactor can be inserted at point 13 to either burn off hydrocarbons/CO with additional oxygen injection, or consume/get excess oxygen via fuel injection. Either technique is possible, and will have the desirable effect of increasing the temperature at Sub-System 2, enabling the generation of additional power. The use of excess $O_2$, with certain catalysts, can also convert $SO_2$ to $SO_3$ at the temperatures that exist at point 13—this conversion would enable sulfur capture (as $H_2SO_4$) via Sub-System 3. Also, a combination of reactors at point 13, or point 51, can be used to control emissions to even lower than what is achievable with this already non-emissive cycle. NOx, a particular vexing emission that has forced the reduction in efficiency (reduced combustion temperatures, lower compression ratios etc) in piston engines, is expected to be nearly eliminated in this system, since the N2 itself can be essentially eliminated via Sub-System 5.

Additional heat recovery/heat utilization techniques familiar to those in the industry can also be applied, over and above the ones discussed herein. Organic Rankine Cycles, in particular using R134A as the working fluid, can utilize engine jacket water heat, especially in colder climates, such as Alaska or Canada. Waste heat at a temperature as low as 165 F has been utilized in geothermal projects when cooling is available at 50 deg F. or less. Adsorption Chillers can be also be integrated with jacket water waste heat and used in lieu of the electric low temperature chiller 48. The heat recovery system or generator, whether it is a SC CO2 (supercritical carbon dioxide) system or Rankine cycle system, such as R134A, or R245FA, can include a recuperator.

It is to be appreciated all the pressures discussed herein can be varied quite a bit via the flexibility of the invention. For example, operation of the engine at 60 psia or higher manifold pressure would be possible with PSA generated O2, operation with much lower compressor pressures at 35 would be possible (with lower levels of refrigeration at point 48) provided that one stayed well above the triple point of $CO_2$ (75 psia is probably a lower limit). This increases efficiency, since it significantly lowers the load at 36, but would also result in poorer gas quality, since the levels of dissolved oxygen in CO2 might increase at point 50. All the pressures and other state variables discussed herein are nominal at this time (provisional filing), and will be narrowed/perfected in the coming year.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A cycle piston engine power system comprising:
   i) a piston engine for generating power and exhaust gas;
   ii) a water cooling and separation unit which receives the exhaust gas and cools and removes water from the exhaust gas to create $CO_2$ gas supply;
   iii) a mixing pressure vessel which receives at least a portion of the $CO_2$ gas supply from the water cooling and separation unit and mixes the $CO_2$ gas supply with oxygen to create a working fluid to be provided to the piston engine; and
   iv) an oxygen generator for providing oxygen to the mixing pressure vessel.

2. The cycle piston engine power system as recited in claim 1, further including a blower which receives the working fluid from the mixing pressure vessel and provides the working fluid to the piston engine.

3. The cycle piston engine power system as recited in claim 2, further including turbo charger which receives the working fluid from the blower and provides it to the piston engine.

4. The cycle piston engine power system as recited in claim 1, further comprising a heat recovery unit to generate additional power.

5. The cycle piston engine power system as recited in claim 3, wherein the heat recover unit generates the additional power via the super critical Brayton $CO_2$ cycle.

6. The cycle piston engine power system as recited in claim 1, wherein the oxygen generator includes first and second Pressure Swing Adsorption beds or Vacuum Pressure Swing Adsorption beds.

7. The cycle piston engine power system as recited in claim 6, wherein the oxygen generator generates the oxygen via mechanical integration of the adsorption beds with the piston engine.

8. The cycle piston engine power system as recited in claim 1, wherein the oxygen generator is an integrated molecular sieve based air separation unit.

9. The cycle piston engine power system as recited in claim 1, wherein the oxygen generator is a membrane based air separation unit or a cryogenic based air separation unit.

10. The cycle piston engine power system as recited in claim 1, further comprising a gas clean-up subsystem which receives a portion of the $CO_2$ gas supply from the water cooling and separation unit and provides conditioned $CO_2$ gas at a desired pressure.

11. The cycle piston engine power system as recited in claim 10, wherein the gas clean-up subsystem is a temperature swing adsorption (TSA) system which includes at least two temperature swing adsorption (TSA) beds.

12. The cycle piston engine power system as recited in claim 10, wherein the gas clean-up subsystem is a pressure swing adsorption (PSA) system or vacuum pressure swing adsorption (VPSA) which includes at least two adsorption beds.

13. The cycle piston engine power system as recited in claim 10, wherein the gas clean-up subsystem includes both temperature swing adsorption (TSA) beds and pressure swing adsorption (PSA) or vacuum pressure swing adsorption (VPSA) beds.

14. The cycle piston engine power system as recited in claim 1, further comprising a waste heat recovery system.

15. The cycle piston engine power system as recited in claim 1, further comprising an adsorption chiller refrigeration system.

16. The cycle piston engine power system as recited in claim 1, wherein the system is a semi-closed system.

17. A cycle piston engine power system comprising:
   i) a piston engine for generating power and exhaust gas;
   ii) a water cooling and separation unit which receives the exhaust gas and cools and removes water from the exhaust gas to create $CO_2$ gas supply;
   iii) a mixing pressure vessel which receives at least a portion of the $CO_2$ gas supply from the water cooling and separation unit and mixes the $CO_2$ gas supply with oxygen to create a working fluid to be provided to the piston engine;
   iv) an oxygen generator for providing oxygen to the mixing pressure vessel; and
   v) a gas clean-up subsystem which receives a portion of the $CO_2$ gas supply from the water cooling and separation unit and provides conditioned $CO_2$ gas at a desired pressure.

18. The cycle piston engine power system as recited in claim 15, further including a blower which receives the working fluid from the mixing pressure vessel and provides the working fluid to the piston engine.

19. The cycle piston engine power system as recited in claim 17, further including turbo charger which receives the working fluid from the blower and provides it to the piston engine.

20. The cycle piston engine power system as recited in claim 17, further comprising a heat recovery unit to generate additional power.

21. The cycle piston engine power system as recited in claim 17, wherein the gas clean-up subsystem is a temperature swing adsorption system which includes at least two temperature swing adsorption (TSA) beds.

22. A semi-closed cycle piston engine power system comprising:
   i) a piston engine for generating power and exhaust gas;
   ii) a water cooling and separation unit which receives the exhaust gas and cools and removes water from the exhaust gas to create $CO_2$ gas supply;
   iii) a mixing pressure vessel which receives at least a portion of the $CO_2$ gas supply from the water cooling and separation unit and mixes the $CO_2$ gas supply with oxygen to create a working fluid to be provided to the piston engine; and
   iv) an oxygen generator for providing oxygen to the mixing pressure vessel; and
   v) a blower which receives the working fluid from the mixing pressure vessel and provides the working fluid to the piston engine.

\* \* \* \* \*